United States Patent [19]

Long

[11] 3,864,041
[45] Feb. 4, 1975

[54] DOPPLER-SHIFT VELOCITY MEASUREMENT SYSTEM USING A TWO-FREQUENCY LASER

[75] Inventor: James R. Long, Danville, Calif.

[73] Assignee: The United States of America as represented by the United States Atomic Energy Commission, Washington, D.C.

[22] Filed: June 6, 1973

[21] Appl. No.: 367,683

[52] U.S. Cl. ................................................ 356/28
[51] Int. Cl. .............................................. G01p 3/36
[58] Field of Search ..................................... 356/28

[56] References Cited
UNITED STATES PATENTS

| 3,409,369 | 11/1968 | Bickel | 356/28 |
|---|---|---|---|
| 3,482,184 | 12/1969 | Schneider et al. | 350/160 |
| 3,687,517 | 8/1972 | Brun | 356/28 |
| 3,825,341 | 7/1974 | Goto | 356/28 |

Primary Examiner—Maynard R. Wilbur
Assistant Examiner—S. C. Buczinski
Attorney, Agent, or Firm—John A. Horan; Frederick A. Robertson; Clifton E. Clouse, Jr.

[57] ABSTRACT

A system for determining the velocity of a moving object, including a laser that emits light at two original frequencies to impinge on a reflector included on the object; a beam splitter and a mirror for directing the light emitted from the laser and the light reflected from the object to a photodiode; and a device for displaying an electrical signal generated in the diode that is the difference between one original frequency and the doppler-shifted frequency of the other original frequency, the difference in frequency being a function of the velocity of the object and being in a range of values that are conveniently measured.

3 Claims, 3 Drawing Figures

DOPPLER-SHIFT VELOCITY MEASUREMENT SYSTEM USING A TWO-FREQUENCY LASER

ORIGIN OF THE INVENTION

The invention disclosed herein was made under, or in, the course of Contract No. W-7405-ENG-48 with the United States Atomic Energy Commission.

BACKGROUND OF THE INVENTION

The invention relates to measurement of the velocity of a moving object by detection of Doppler frequency shifts of laser light reflected from the object, and more particularly, it relates to a two-frequency laser and detection of the difference between one original laser frequency and the shifted frequency of the other original laser frequency to determine the velocity of the object.

A particular problem in measuring velocities by means of Doppler frequency shifts of laser light is that the frequency shifts are in the GHz (microwave) range and therefore are too large to be measured conveniently with conventional equipment on a short time scale. It is necessary, therefore, in a practical transient laser Doppler-shift velocity measurement system that the difference frequency that is to indicate the Doppler shift be easily measured, and that the frequency be a low-frequency in the MHz (radio frequency) range. Such measurement will be accurate, direct and accomplished with simple and readily available equipment.

SUMMARY OF THE INVENTION

In brief, the present invention pertains to a system for measuring the velocity of a moving object by detection of a single difference frequency derived from Doppler frequency shifts of laser light reflected from the object. The system includes a two-frequency laser directed at the moving object, a detector, and optical devices for directing original and reflected laser beams at the detector. The original frequencies are selected so that the difference between one original laser frequency and the shifted frequency of the other original laser frequency is a small percentage of a predicted shift of either one of the original frequencies. Such a difference may be made to occur in a frequency range that is much lower than the difference between an original frequency and its Doppler-shifted counterpart. This system enables the difference to be easily, accurately and simply measured with conventional devices.

An object of the invention is to measure the velocity of a moving object by deriving from Doppler-shifted laser frequencies a signal that is in an easily measured frequency range.

Another object is to simplify velocity measurements of a moving object, increase the accuracy of such measurements, improve transient presentation of such measurements, and perform the measurements with conventional equipment.

Another object is to provide improved means for measuring the velocity of projectiles, free surface velocities due to shock waves and generally any object from which a detectable reflection of laser light may be obtained.

Other objects and advantageous features of the invention will be apparent in a description of a specific embodiment thereof, given by way of example only, to enable one skilled in the art to readily practice the invention which is described hereinafter with reference to the accompanying drawings.

DESCRIPTION OF AN EMBODIMENT

Figure 1:
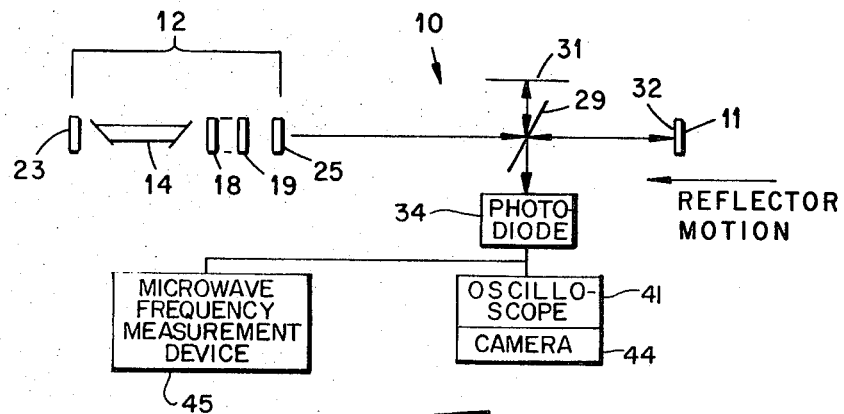
FIG. 1 is a schematic diagram of a system including a two-frequency laser for measuring the velocity of a moving object by means of Doppler-shifted laser frequencies, according to the invention.
Figure 2:
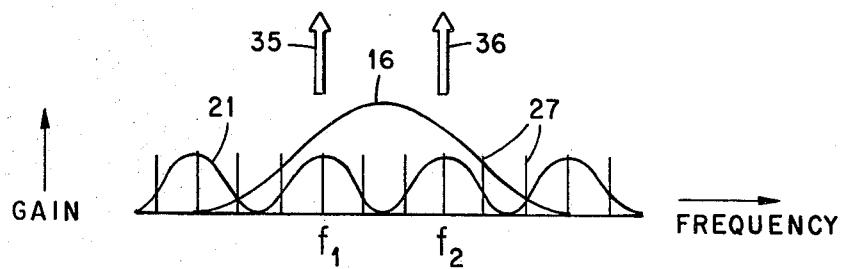
FIG. 2 is a frequency-gain curve of the frequencies generated in the laser of FIG. 1 and shows the way that the frequencies interact to create gain peaks in the laser cavity and thereby yield the two-frequency beam necessary for the measurements made with the system of FIG. 1.
Figure 3:
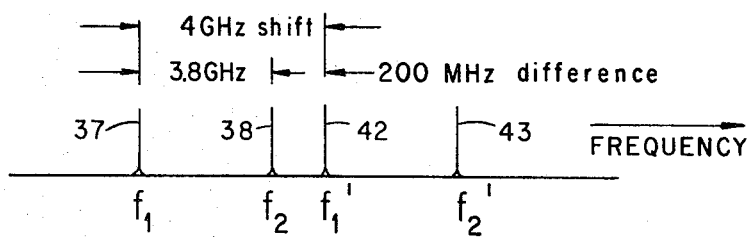
FIG. 3 is a chart showing the relationship between the frequencies of the original beam of the system of FIG. 1 and their Doppler-shifted counterparts.

Referring to the drawing, there is shown in FIG. 1 a schematic diagram of a system 10 for measuring the velocity of a moving object 11 by means of Doppler-shifted laser frequencies. The system 10 includes a two-frequency laser 12 comprised of an internal gain medium 14 for generating frequencies that fall along a gain curve 16 (FIG. 2). The laser 12 also includes a pair of etalons 18 and 19 which have one anti-reflective coated surface and one partially reflective uncoated surface. Alternatively, the etalons 18 and 19 may be a single fixed-length cylinder of glass such as indicated by the dotted lines therebetween, with partially reflective uncoated end surfaces. The etalons 18 and 19 allow frequencies to fall along a gain curve 21 (FIG. 2), but the etalons are also adjustable to vary the length therebetween to allow different frequencies. The laser 12 also includes at opposite ends a 100% reflecting mirror 23 and a partially reflecting mirror 25. Long cavity frequencies are developed between these mirrors and are charted as frequency modes 27 in FIG. 2. As indicated in FIG. 2, laser action occurs in the system 10 at frequencies where gain is high with gain peaks 35 and 36 occurring at frequencies $f_1$ and $f_2$. These gain peaks result in outputs 37 and 38 which are passed through the partially reflecting mirror 25 towards a beam splitter 29 for direction towards a mirror 31 and a reflecting surface 32 on the object 11. Reflections of the outputs 37 and 38 from the mirror 31 and reflector surface 32 are also directed by and through the beam splitter to impinge on the photodiode 34. An oscilloscope 41 is connected to the photodiode for detecting the resultant photodiode output. Photographs of the oscilloscope trace may be taken for later study by means of a camera 44. The frequency relationship of the outputs 37 and 38 and their Doppler-shifted reflections 42 and 43 at Doppler-shifted frequencies $f_1'$ and $f_2'$ from the surface 32 are shown in FIG. 3. A photodiode inherently is a square law detector so that the beams 37, 38, 42 and 43 impinging on the photodiode 34 and their sums are squared at the output of the diode. Because of the original choice of frequencies, all of the resulting difference signals are in the 4–8 GHz range or above and therefore far outside the normal range of response of the diode and the oscilloscope except one: $f_1' - f_2$ which is in the MHz range. With an oscilloscope set to respond to this range of frequencies only the difference frequency $\Delta f = f_1' - f_2$ will be displayed. By observation of FIG. 3, it is apparent that $$|f_1' - f_2| = |(f_1' - f_1) - (f_2 - f_1)|, = |f_1' - f_2|.$$

The frequency difference $f_2 - f_1$ may be measured accurately with a microwave frequency measurement device 45 upon the setting of the elatons 18 and 19 and since $f_1' - f_2$ is known from reading the oscilloscope, the adding of these two frequencies gives the Doppler-shifted difference frequency $f_1' - f_1$ directly:

$$f_1' - f_1 = (f_1' - f_2) + (f_2 - f_1).$$

The velocity $v$ of the moving object may be determined from the basic formula:

$$\Delta f = 2 f_o \, v/c$$

where $$\Delta f = f_1' - f_1 \text{ and}$$

$f_o = f_1, f_1$ being known from the original setting of the laser 12.

As an example of the use of the invention, a commercial long-laser argon cavity may be used for laser 12, a single fixed-length cylinder etalon of glass may be used for the etalons 18 and 19 and known conventional microwave techniques may be used to establish the initial difference between frequencies $f_1$ and $f_2$. This difference may be set by the length of the single glass cylinder etalon according to the formula:

$f_2 - f_1 = c/2L$, where $L$ is the length between the ends of the cylinder. For example, for a 3.8 GHz frequency difference, as discussed below, an etalon of length $$L = c/2\Delta f = 3 \times 10^{10}/2 \times 3.810^9 = 30/7.6 = 3.95 \text{ cm}.$$

would be required.

In a use of the invention, for example, to measure a velocity of 1 mm/μsec, the frequency shift of an argon laser line at 5000 A is about 4 GHz. This frequency, because it is in the microwave range, is difficult to display or measure accurately on a transient basis. However, by predicting the velocity to 5%, the shift is then known to be between 3.9 GHz and 4.1 GHz. Then, using the differential technique described hereinbefore, the resulting difference signal is known to be between 100 MHz and 300 MHz and may conveniently be displayed and measured on a transient basis with the oscilloscope 41 and camera 44. Also, if the difference signal is measured to 5% accuracy, the overall measurement is accurate between $$0.05 \times 300/4100 = 0.0036 = 0.4\% \text{ and}$$

$$0.05 \times 100/3900 = 0.0013 = 0.1\%, \text{ respectively}.$$

This is an improvement in accuracy of better than a factor of ten over the oscilloscope measurement accuracy. The measurement of the difference frequency can be conveniently made on a transient basis of the order of 100 nsec because there are 10 to 30 cycles of the difference frequency during this time, which is a sufficient number of cycles to make a 5% measurement. With 10 cycles, for example, the reading error may be averaged over the 10 cycles.

It is also possible to modify the laser 12 to operate with more than two, free-running, longitudinal modes and thereby acquire a possibility of probing a lower velocity range.

For further discussion of the invention, reference is made to USAEC technical report No. UCID-16174, *Two-Frequency Argon Laser For Differential Doppler Velocity Measurements*, James R. Long, Oct. 16, 1972, Lawrence Livermore Laboratory, University of California, Livermore, Cal.

While an embodiment of the invention has been shown and described, further embodiments or combinations of those described herein will be apparent to those skilled in the art without departing from the spirit of the invention.

What I claim is:

1. A system for determining the velocity of a moving object, including:

a reflector included on said object;

a two-frequency laser for developing frequency gain peaks for emission of light at first and second original frequencies $f_1$ and $f_2$ to impinge on said reflector and be reflected therefrom;

a square law light detector, said detector being a photodiode;

means for directing light emitted from said laser and light reflected from the object to said detector, the frequencies of said light at frequencies $f_1$ and $f_2$ being reflected from said object and Doppler-shifted to a third frequency $f_1'$ and a fourth frequency $f_2'$, respectively, according to the velocity of said object;

means connected to said detector for indicating a difference frequency $(f_1' - f_2)$, said means connected to said detector including an oscilloscope for displaying as a trace the difference frequency $(f_1' - f_2)$, and a camera for permanently recording the oscilloscope trace; and means for determining the difference between said second frequency $f_2$ and said first frequency $f_1$, the difference frequency $(f_1' - f_2)$ added to the difference between the frequencies $f_2$ and $f_1$ being a measure of the velocity of the object, said laser being selected to produce frequencies $f_1$ and $f_2$ relative to the estimated velocity of said object so that all difference frequencies between the frequencies $f_1, f_2, f_1'$ and $f_2'$, other than the difference frequency $(f_1' - f_2)$ are outside the range of response of said detector and said oscilloscope.

2. A velocity measurement system according to claim 1 wherein said two-frequency laser includes end mirrors, an internal gain medium between said mirrors, and first and second individual passive internal etalons between said gain medium and one of said mirrors; said mirrors, said internal gain medium and said etalons being coaxial; said laser being operable to generate beams that are characteristic of said gain medium, the separation of the partially reflective ends of said etalons and of the separation of the mirrors; all said beams combining to produce gain peaks within said two-frequency laser to produce said light at said first and second freqencies $f_1$ and $f_2$ for emission from said two-frequency laser.

3. A velocity measurement system according to claim 1 wherein said two-frequency laser includes end mirrors, an internal gain medium between said end mirrors, a passive single fixed length of glass between said internal gain medium and one of said mirrors, said mirrors, internal gain medium and length of glass being coaxial, said laser being operable to generate beams that are characteristic of said gain medium, the length of said single fixed length of glass and of the separation of said mirrors, all said beams being combined to produce gain peaks within said two-frequency laser to produce light at said first and second frequencies $f_1$ and $f_2$ for emission from said two-frequency laser.

* * * * *